April 7, 1970   KENSHI KONDO   3,505,631
ELECTRIC THERMOSTAT SWITCH

Filed Sept. 17, 1968   3 Sheets-Sheet 1

INVENTOR.
Kenshi Kondo
BY
Attorney.

April 7, 1970

KENSHI KONDO 3,505,631

ELECTRIC THERMOSTAT SWITCH

Filed Sept. 17, 1968

INVENTOR.
Kenshi Kondo

BY

Attorney.

United States Patent Office 3,505,631
Patented Apr. 7, 1970

3,505,631
ELECTRIC THERMOSTAT SWITCH
Kenshi Kondo, 6–3 Tamagawa-Seta-machi, Setagaya-ku, Tokyo, Japan
Filed Sept. 17, 1968, Ser. No. 760,163
Claims priority, application Japan, Mar. 27, 1968, 43/23,545
Int. Cl. H01h 37/38, 37/40, 3/12
U.S. Cl. 337—320                                                15 Claims

ABSTRACT OF THE DISCLOSURE

A thermostat switch having a bellows, which is extended or compressed by means of thermally expanding liquid, is by a spring connected with one end of each of a pair of adjacent longitudinal metal contact leaves which are fixedly mounted at their other ends and resiliently resist flexure from substantially non-flexed condition in which they are in contact with each other. As the temperature rises, the responding bellows will increasingly load the spring which at a set temperature will flex the leaves out of contact with each other, with excessive flexure of the leaves being prevented by a fixed stop.

BACKGROUND OF THE INVENTION

This invention relates to a switch mechanism responsive to temperature change and, more particularly, to a thermostat switch opening or closing upon reaching a predetermined temperature level in its temperature-sensing part.

There are known thermostat switches having an actuating element and a pair of leaf springs with contact points in the middle, with these parts contained in a thermosensitive cylinder. The cylinder as an enclosure expands with a rise in its ambient temperature. When the linear differential expansion between the cylinder and the contact-carrying leaves reaches a certain predetermined value, the actuating element engages with the leaves and exerts a pull thereon to open or close the contact. Such a thermostat switch can be alternately arranged to operate on falling temperature by causing the actuating element to impart a push, instead of a pull, to the contact-carrying leaves when the linear differential contraction reaches a certain predetermined value. The former switch is of tension type and the latter switch is of compression type.

These known thermostat switches have a drawback in that the linear differential expansion or contraction is too small to ensure accurate action for operating the switch, i.e., actuating the contact-carrying leaves. Since the elastic self-restoring property of the contact-carrying leaves must be retained to assure positive restoring action at all times, the range of operable temperature levels for the tension type switch is necessarily limited to a certain value, for example, +40° C. higher than the temperature setting on rising temperature, there being no such limit on falling temperature. Similarly, in case of the compression type switch there is a lower limit, for example, −40° C. lower than the temperature setting on falling temperature, there being no such limit on rising temperature.

Thermostat switches are extensively utilized in diversified areas of application. The thermostat switch according to this invention is contemplated for application to temperature control especially, though not exclusively, in equipment and apparatus mounted on railway cars and the like, and for various heating devices used on agricultural equipment, with high vibration resistivity being required for the former applications and high moisture resistivity for the latter applications.

It is among the objects of the present invention to provide an improved thermostat switch which has none of the above-mentioned drawbacks and meets the aforementioned requirements.

It is a more specific object of the invention to provide an improved thermostat switch which utilizes the relatively large and unvarying coefficient of thermal expansion of a liquid in actuating the pair of contacts in a highly sensitive, stable and accurate manner, without applying further force to the contact-carrying leaves after actuation of the switching element.

Another object of the invention is to provide a thermostat switch of improved vibration resistivity, in which springs are employed to hold the switching element in tensioned or compressed state in a locked position so that the element will not rattle.

A further object of the invention is to provide a thermostat switch of improved moisture resistivity.

A primary form of thermostat switch according to the invention has a bellows which expands and contracts on expansion and contraction of a thermally responsive liquid, a follower actuated by the bellows, a pair of adjacent resiliently flexible metal contact leaves, a primary spring interposed between the follower and one of two opposite supports on which the leaves are anchored with their opposite ends, an adjusting screw for shifting the other support to thereby adjust the temperature setting; and a stop on said other support limiting movement of said one support in a direction to prevent the leaves from being subjected to excessive flexing force from said one support. In addition to this primary switch, there are two other switches which embody certain modifications.

The invention will be further explained in, and other objects and features will become apparent, from the following description, with reference to the accompanying drawings, in which.

Figure 1:
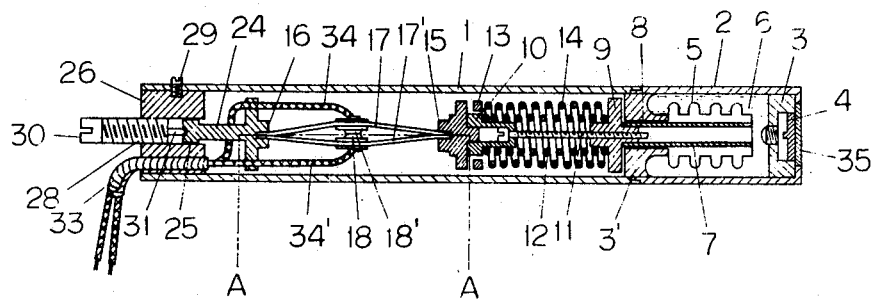
FIG. 1 is a longitudinal section through a thermostat switch of one embodiment of this invention.

Referring to FIG. 1, a sleeve 1 of stainless steel, for example, is jointed to a thermo-sensitive casing 2 of good thermal conductivity, such as brass, for example, which forms an extended end of sleeve 1. One end of the casing 2 fittedly receives a plug 3 and the other end thereof receives another plug 3'. Throughout the description to follow, the thermostat switch will be assumed to be in erect disposition, with the casing 2 being at the bottom side, and such terms as top, bottom, upper, lower and the like will be used in the sense of this assumed erect switch disposition.

The plug 3 has a tapped center hole for a filler plug 4. A bellows 5, with its one end closed and other end open and made of phosphor bronze, for example, depends from plug 3', with the open end of the bellows being brazed to plug 3' so that it leaves a sealed space in the casing 2. This space contains a thermally expanding liquid 6, such as alcohol or oil, for example. A follower sleeve 7 is slidable in a guide aperture 8 in plug 3' and extends in the bellows 5 to the closed end thereof. The top end of follower 7 is secured to a lower spring seat 9 with a tapped center hole. A screw 11 is with its lower end threadedly received in this hole, and extends with its head into a cylindrical bore in a pusher 10 in which it has freedom of limited axial motion. Interposed between pusher 10 and the lower spring seat 9 is a primary spring 12, around which is in this instance disposed a secondary spring 14 that is interposed between the lower spring seat 9 and an upper spring seat 13. Pusher 10 is located within a center aperture in the spring seat 13 and, hence, capable of freely moving axially therein.

There are provided two adjacent resiliently-flexible longitudinal metal leaves 17 and 17' which in this instance insulatingly carry contact point parts 18, 18' and are with their opposite ends anchored to lower and upper supports 15 and 16, of which the lower support 15 is carried by pusher 10 and the upper support 16 is fixed so that on movement of the lower support toward the upper support the leaves 17 and 17' are resiliently flexed for disengagement of the contacts 18, 18'. Of course, it is fully within the purview of the present invention to have the leaves 17, 17' themselves conductive and provided with integral centrally offset contact point parts that serve as the contacts, in which case the leaves are anchored to the supports 15, 16 insulated from the latter and from each other.

Figure 2:
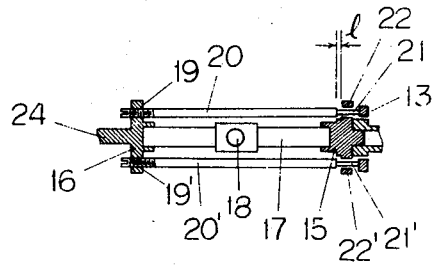
FIG. 2 is a fragmentary section through the switch taken along the line A—A of FIG. 1.

As shown in FIG. 2, there are threadly received in the upper support 16 two adjustable rods or stems 20, 20' having reduced ends 21, 21' which extend through apertures 22, 22' in the lower support 15 and bear against spring seat 13.

Figure 3:
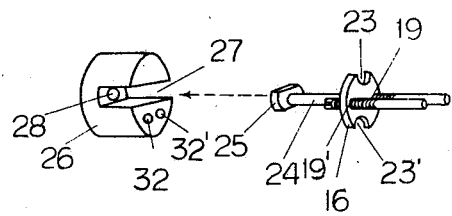
FIG. 3 is an exploded perspective view of certain prominent parts of the switch.

The top end of sleeve 1 is closed by a head plug 26 locked in place by a set screw 29. Provided in plug 26 are two apertures 32, 32' (FIG. 3) for passing lead wires 34, 34', and a tapped center hole 28 opening into a cross slot 27 in plug 26 (FIG. 3). The wires 34, 34' lead from the contact points 18, 18'. Upper support 16 has an upward shank 24 whose top is formed as a key 25 received in slot 27 and capable of moving therein up and down but incapable of twisting therein. An adjustment screw 30 is received in the center hole 28 in head plug 26. This screw has a finger extension 31 on its inner end resting in a recess point in the top face of key 25.

The contact leaves 17, 17' between the supports 15, 16 become subjected to a force tending to buckle them when adjusting screw 30 downwardly. While this force is transmitted by the leaves 17, 17' to the lower support 15, such downward adjustment of screw 30 is by the stems 20, 20' also transmitted to the spring seat 13 in further compressing secondary spring 14. The compressive force of spring 14 acts on the lower spring seat 9 to force follower 7 against the bottom of the bellows 7. In this condition, the shoulders formed by the reduced ends 21, 21' on the stems 20, 21' are some distance above the lower support 15 (FIG. 2), and the thermostat switch as a whole is sufficiently spring-loaded to obviate any rattling of parts thereof under vibrational forces.

33 is a flexible sheeth provided on each lead wire on its passage through plug 26, and 35 is a disc for closing the bottom end of the casing 2 after the liquid 6 has been injected into the sealed space therein.

With the casing 2 of the described switch attached to the temperature-detecting portion of an apparatus to be thermally controlled, and with the adjustment screw 30 set for a desired temperature, the switch performs as follows. First, as the temperature of the apparatus rises, the sealed-in liquid 6 in casing 2 expands to compress bellows 5. This compression will, through follower 7, cause upward movement of spring seat 9, thereby compressing primary spring 12, with the head of screw 11 then merely sliding upwardly within the cylindrical bore in pusher 10. As this action continues, the compressive force of the primary spring increases and in time overcomes the resilient resistance of the contact leaves 17, 17' against flexure from contact with each other, with the result that the leaves will be flexed out of contact with each other and the switch thereby opened. In this increasingly compressing the primary spring 12 for switch opening, the secondary spring 14 will also be further compressed, but its compression is against seat 13 which is held against give by the stem 20, 20' on the upper support 16. While in the described switch the bellows 5 is surrounded by the sealed-in liquid 6 in the casing 2, it is within the ambit of this invention to arrange the switch so that this operating liquid is directly within the bellows on differently arranging the latter in self-evident manner, whereby the casing 2 may be eliminated.

The coefficient of thermal expansion of the operating liquid 6 considered for use in this invention is relatively large and takes a value of 0.015 mm. per degree centigrade, for example, as compared with 0.001 mm. per degree centigrade of conventional metallic expanding elements. For a given temperature change, the contacts open about 15 times faster in the switch according to this invention than in those using conventional metallic elements. It follows, therefore, that the present thermostat switch is far less liable to contact deterioration due to sparking, and is suitable for breaking and making even DC circuits.

Upon opening of the contacts, the operation of the heating device will be interrupted but, since the heating device will have some thermal inertia as in most cases, the temperature could continue to rise for a short while, exhibiting a phenomenon referred to as "overshooting." During this overshooting period, the contact leaves 17, 17' are subjected to increasingly larger flexing forces with increasing compression of the primary spring 12. Excessive flexing of the contact leaves 17, 17' will adversely affect their elastic self-restoring property, wherefore such excessive flexing must be avoided. This is achieved by the stems 20, 20' of which the shoulders at their reduced ends 21, 21' act as stops to limit upward displacement of the lower support 15 to keep flexure of the leaves 17, 17' at a permissible maximum. When the temperature falls as the result of heat interruption, the whole sequence of thermally induced actions of the switch described reverses to close the contacts, whereby operation of the heating device is restored.

It will be clear from the foregoing description that the temperature setting, i.e., the setting of the switch for opening at a predetermined temperature, can be varied at will by adjustment of screw 30. Adjustment of this screw 30 in opposite directions will have the effect of increasing or decreasing the spring load in the switch to be overcome by the bellows 5 in opening the contacts on rising temperature.

Figure 4:
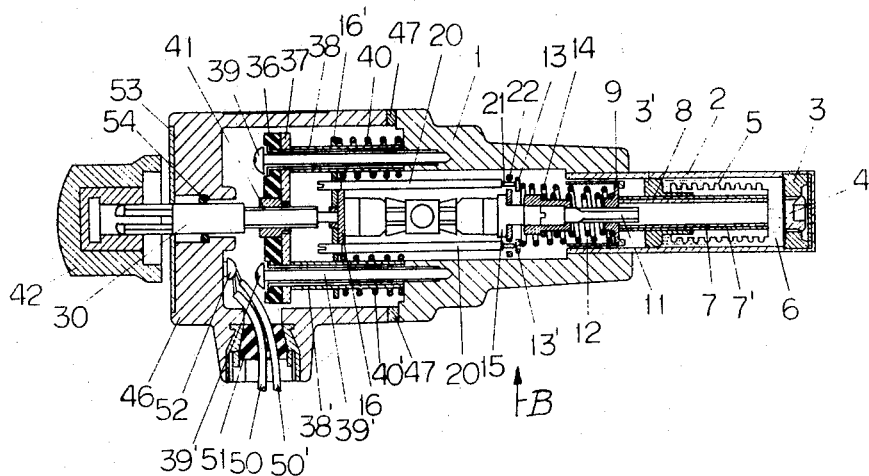
FIG. 4 is a longitudinal section through a modified thermostat switch.
Figure 5:
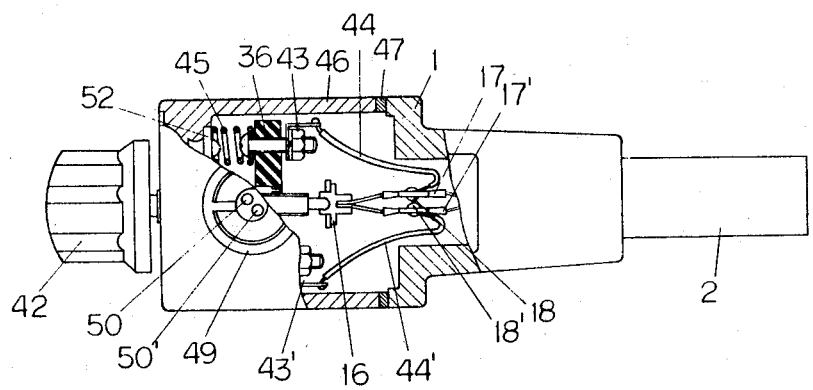
FIG. 5 is a view, partly in side elevation and partly in section, of the switch of FIG. 4 as seen in the direction of the arrow B.

FIGS. 4 and 5 show a modified thermostat switch of which the enclosure of the switch parts is formed by a sleeve 1 and a cap 46, with both being made of preferably heat-resistive synthetic resin, such as carbolic resin, for example, the sleeve 1 being homogeneously integral with the casing 2 by being molded thereunto during manufacture. Cap 46 is closed over the top end of sleeve 1 with a packing 47 between them, and they are suitably secured together as by screws (not shown). The upper leaf support 16 is provided on a disc or plate 16' arranged for sliding movement as explained later. A terminal plate 36, made of suitable insulating material and provided with a reinforcing plate 37, is located in the interior of cap 46 and, by means of posts 38, 38' and screws 39, 39' mounted on the top face of sleeve 1 in spaced relation therewith. Plate 16' has two apertures by which it is slidably received on the posts 38, 38', and this plate 16' is biased upwardly by springs 40, 40' surrounding the posts. Terminal plate 36 is provided with a centrally-located tapped hole 41 receiving an adjusting screw 30 the inner end of which bears against the upper support 16.

By adjusting screw 30 at its knob 42, the upper support 16 will be adjusted to vary the temperature setting of the switch. The springs 40, 40' exert on the upper support 16 a force to hold the same in its adjusted position.

As shown in FIG. 5, wires 44, 44' leading from contact points 18, 18' are connected to terminals 43, 43' on plate 36. On the top side of this terminal plate spring leads 45 are provided between terminals 43, 43' and another pair of terminals 52 on cap 46 to connect these pairs of terminals electrically. The top ends of spring leads 45 bear against the top terminals with more or less pressure and their bottom ends are anchored to terminals 43, 43'. Outgoing lead wires 50, 50' extend from stud terminals 52 and pass through a rubber packing 51 in an outlet 49 in cap 46. 7' is a heat-resistant synthetic-resin sleeve surrounding follower 7, 53 is a graduated temperature dial mounted on the top of cap 46, and 54 is a packing to seal cap 46 at the passage thereinto of the adjustment screw 30.

The described advantages of the thermostat switch of FIG. 1 are retained in the switch of FIGS. 4 and 5, and the latter switch has an additional feature in the spring-urged upper spring support 16, 16', in that the same is powerfully constrained against back-or-forth give under vibrational or other disturbing forces on the switch by two opposing forces exerted by the adjustment screw 30 on top and by the bias springs 40, 40' at the bottom.

Figure 6:
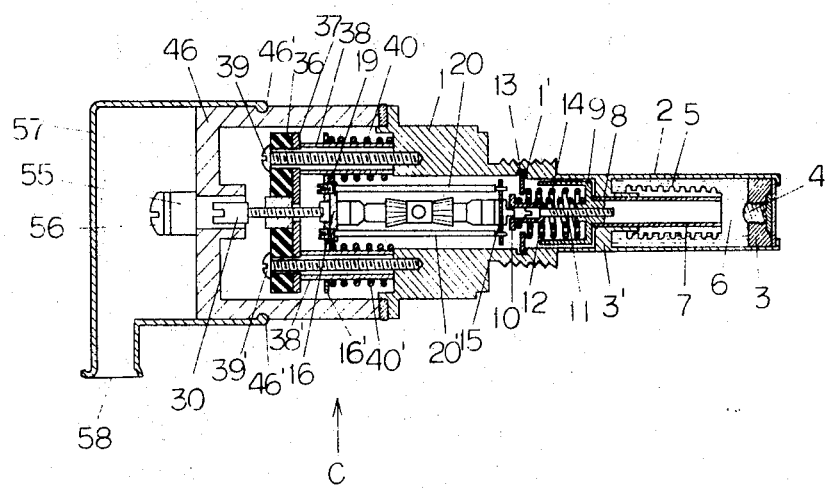
FIG. 6 is a longitudinal section through another modified switch.
Figure 7:
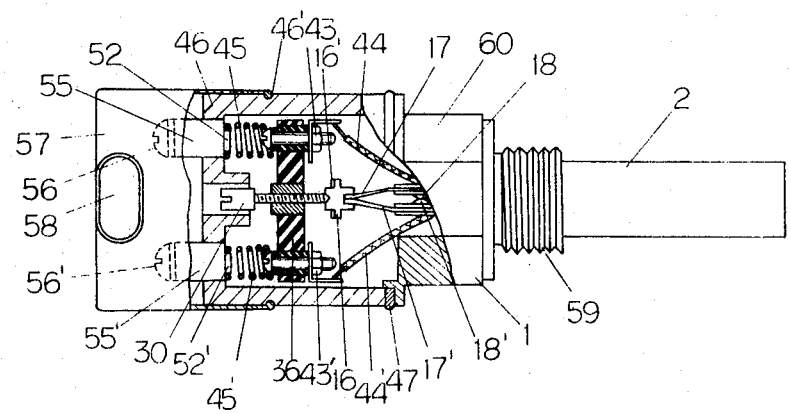
FIG. 7 is a view, partly in side elevation and partly in section, of the switch in FIG. 6 as seen in the direction of the arrow C.

Another modified switch shown in FIGS. 6 and 7, has terminals 55, 55' with lead clamping screws 56, 56' of cap 46. The inner ends of these terminals are stepped to receive the adjacent ends of spring leads 45, 45'. The outside terminals 55, 55' on the cap 46 are protected by a weather cover 57 whose rim ends are arranged for snap into an annular groove 46' in cap 46. Lead wires, (not shown) for connection with the external circuit are to pass through an outlet 58 in the weather cover 57. Sleeve 1 is constructed for screw mounting, with a section thereof next to the casing 2 being to this end threaded at 59, and an exposed part of sleeve 1 being shaped hexagonal as at 60 (FIG. 7) for application of a wrench thereto in mounting the switch. Upper spring seat 13 is in the form of a split ring snapped into an annular groove 1' in the inside wall of sleeve 1, with the secondary spring 14 bearing against ring 13, whereby the contact leaves are totally disassociated from the secondary spring. This feature is calculated to keep the secondary spring under any desired compression and not in any way influenced by adjusted temperature settings of the switch, so that the switch may be particularly resistant to vibrational and other disturbing forces. Also, since the switch enclosure as a whole is water-proof, reliable switch performance will not be affected adversely even in excessively damp or humid places.

What is claimed is:

1. A thermostat switch, comprising spaced supports of which one support is fixed and the other support is guided for movement toward and away from said one support; a pair of resilient longitudinal metal leaves extending between said supports in adjacent face-to-face relation with each other and being with their opposite ends anchored to said supports for endwise compression and responding flexure of said leaves on movement of said other support toward said one support, with said leaves yieldingly resisting flexure from a minimum flexed condition in which they are in contact with each other, and being resiliently flexed out of contact with each other on movement of said other support toward said one support; electrical contact parts on said leaves; a bellows spaced from said other support and being fixed at one end and subjected to a thermally responsive liquid for movement with its other active end in a certain direction on thermal expansion of said liquid; and a spring interposed between said other support and active bellows end for urging said other support toward said one support with increasing force as said active bellows end moves in said certain direction.

2. A thermostat switch as in claim 1, which further provides another spring acting on said active bellows end to urge it in a direction opposite to said certain direction.

3. A thermostat switch as in claim 1, which further provides a fixed stop in the path of movement of said other support toward said one support for limiting such movement to prevent excessive flexing of said leaves.

4. A thermostat switch as in claim 1, in which said one support is adjustable to and from said other support for varying the temperature setting of the switch.

5. A thermostat switch as in claim 1, in which said leaves insulatingly carry substantially midway of their lengths contacts which are in engagement with each other in said minimum flexed condition of said leaves, and said leaves are at their anchored ends in face-to-face engagement with each other.

6. A thermostat switch as in claim 1, in which said other support is intermediate said one support and bellows, said active bellows end is on thermal expansion of said liquid moved toward said other support, and said spring is a preloaded compression spring interposed between said other support and active bellows end, and there is further provided a connection between said other support and active bellows end providing for free motion between them over a given range, with said spring urging said other support to one end of said free-motion range.

7. A thermostat switch as in claim 6, in which said free-motion connection is formed by a bore and counterbore in said other support, and a screw with a head and threaded shank, of which said head is received in said counterbore with freedom of limited axial motion therein, and said shank extends through said bore and is threadedly received in said active bellows end, whereby on adjustment of said screw at said head the preload of said compression spring is varied.

8. A thermostat switch as in claim 6, which further provides a fixed seat between said one support and active bellows end, and another preloaded compression spring interposed between said seat and active bellows end urging the latter away from said other support.

9. A thermostat switch as in claim 8, in which said one support is adjustable to and from said other support for varying the temperature setting of the switch, and said seat is movable with said one support to vary the preload of said other compression spring.

10. A thermostat switch as in claim 8, in which said seat is between said other support and bellows, said one support has a projecting rod with a free end against which said seat is urged by said other compression spring, and said rod has an intermediate shoulder in the path of movement of said other support toward said one support for limiting such movement to prevent excessive flexing of said leaves.

11. A thermostat switch as in claim 10, in which said one support is adjustable to and from said other support to vary the temperature setting of the switch.

12. A thermostat switch as in claim 1, in which said other support is intermediate said one support and bellows, and said one bellows end is open and next to said other support, and there is further provided a thermosensitive casing holding said thermally responsive liquid, with said bellows being located in said casing and attached with said one end to the latter so that the interior of the bellows is sealed from said liquid and is open to the outside of the casing through said open bellows end, and said bellows has at its other end a follower extending through said open end thereof, with said spring being interposed between said other support and follower.

13. A thermostat switch as in claim 1, which further provides a fixed mounting on the side of said one support opposite to that on which said leaves are anchored, with said mounting having a tapped hole in line with said leaves and a transverse groove to which said hole leads and which is next to said one support, a key formation on said one support received in said groove for movement therein to and from said other support but held against rotation therein, and an adjustment screw in said hole and bearing against said key formation, whereby on adjustment of said screw the temperature setting of the switch is varied without twisting said leaves.

14. A thermostat switch as in claim 1, which further provides a mounting between said supports, parallel guide posts extending from said mounting toward and beyond said one support and having a cross connector at their ends, with said one support being guided on said posts for movement to and from said other support, an adjustment screw with a threaded shank received in said connector and extending toward said one support, and preloaded compression springs surrounding said posts and interposed between said one support and mounting for urging said one support against said screw shank, whereby on adjustment of said screw the temperature setting of the switch is varied without twisting said leaves.

15. A thermostat switch as in claim 6, in which said one support is adjustable to and from said other support for varying the temperature setting of the switch, and there is further provided a stop movable with said one support and being in the path of movement of said other support toward said one support for limiting such movement to prevent excessive flexing of said leaves, a fixed seat between said one support and bellows, and another preloaded compression spring interposed between said seat and active bellows end urging the latter away from said support.

References Cited
UNITED STATES PATENTS

| | | | |
|---|---|---|---|
| 2,582,483 | 1/1952 | Hallerberg | 200—81.5 |
| 2,506,070 | 5/1950 | Dalzell | 337—320 |
| 2,767,923 | 10/1956 | Mathews | 337—320 X |
| 3,109,901 | 11/1963 | Strauss | 200—159 X |
| 3,272,942 | 9/1966 | Brandl | 200—83.3 |

HIRAM B. GILSON, Primary Examiner

U.S. Cl. X.R.

200—159